United States Patent [19]

Mengel

[11] Patent Number: 4,490,597
[45] Date of Patent: Dec. 25, 1984

[54] MICROWAVE PERMEABLE PRESSURE COMPENSATING CONTAINER

[76] Inventor: Clare L. Mengel, 5530 Longfellow Rd., Santa Barbara, Calif. 93111

[21] Appl. No.: 425,334

[22] Filed: Sep. 28, 1982

Related U.S. Application Data

[63] Continuation-in-part of Ser. No. 76,995, Sep. 19, 1979, abandoned.

[51] Int. Cl.³ .................. H05B 6/80; A47J 27/088
[52] U.S. Cl. .................. 219/10.55 E; 219/10.55 R; 219/440; 426/243; 426/403; 215/315; 220/316; 99/369; 99/DIG. 14; 126/374
[58] Field of Search ............ 219/10.55 E, 10.55 F, 219/10.55 M, 10.55 R, 431, 440; 426/118, 407, 403, 243, 241; 220/316, 367; 215/307, 311, 315, 274, 273, 275; 99/369, 371, 359, DIG. 14; 126/374

[56] References Cited

U.S. PATENT DOCUMENTS

| | | | |
|---|---|---|---|
| 2,622,187 | 12/1952 | Welch | 219/10.55 E |
| 3,297,187 | 1/1967 | Thiesen | 215/275 X |
| 3,967,746 | 7/1976 | Botkin | 426/118 X |
| 3,973,694 | 8/1976 | Tess | 220/316 X |
| 4,024,982 | 5/1977 | Schultz | 220/316 X |
| 4,093,841 | 6/1978 | Dills | 219/10.55 E |
| 4,103,431 | 8/1978 | Levinson | 219/10.55 E X |
| 4,103,801 | 8/1978 | Walker | 220/316 X |
| 4,257,394 | 3/1981 | Zabel | 220/316 X |
| 4,406,860 | 9/1983 | Beauvais et al. | 219/10.55 E X |

Primary Examiner—P. H. Leung
Attorney, Agent, or Firm—Birch, Stewart, Kolasch & Birch

[57] ABSTRACT

A pressure compensating container having a cavity and including an open end. A closure lid is provided for sealing the open end of the container. A pressure regulating device is operatively connected to the container for regulating the pressure within the cavity. The base portion and the lid portion are constructed of a microwave permeable material. A safety pressure relief valve is provided having a manually operated pressure relief button for relieving the pressure within said cavity of said pressure compensating container.

5 Claims, 6 Drawing Figures

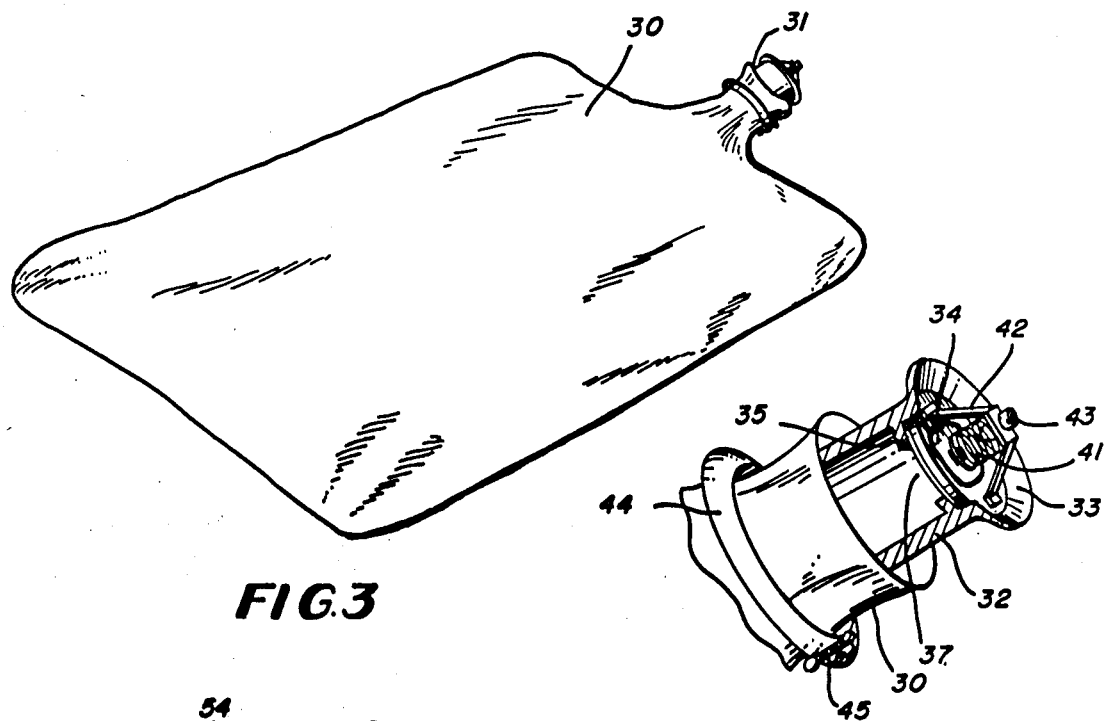
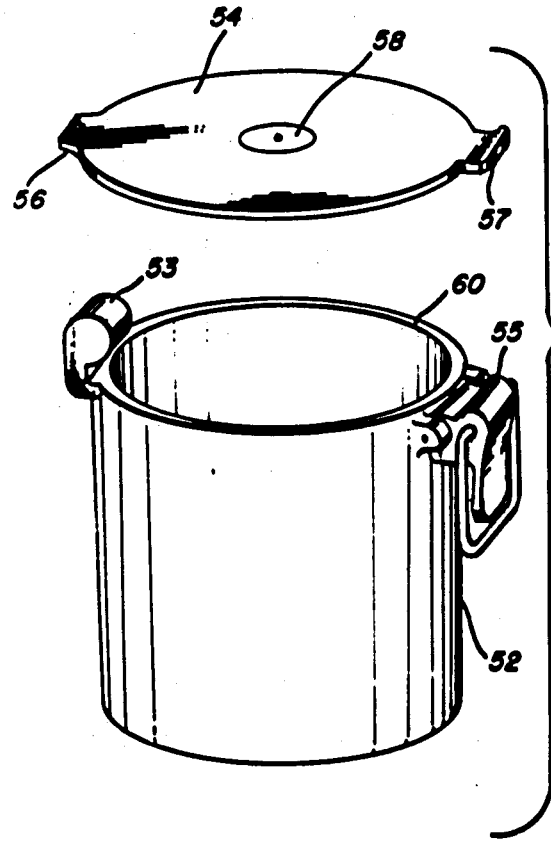
FIG.3
FIG.4
FIG.5
FIG.6

MICROWAVE PERMEABLE PRESSURE COMPENSATING CONTAINER

CROSS REFERENCE TO RELATED APPLICATIONS

The present application is a continuation-in-part of copending application Ser. No. 076,995, filed Sept. 19, 1979, now abandoned.

BACKGROUND OF THE INVENTION

1. Field of the Invention

The present invention relates to a pressure compensating container which may be used in a microwave oven or on the upper surface of a conventional stove.

2. Description of the Prior Art

Modern cooking conveniences are designed to decrease cooking time and increase cooking efficiency of various foods. Microwave ovens are an advance in the art because they decrease cooking time and increase efficiency. However, microwave ovens have a tendency to extract moisture from food when the food is cooked therein. Therefore, there is a need for a cooking utensil for preventing the dehydration of food when undergoing cooking within a microwave oven.

As is conventional, a pressure cooker is normally used for cooking foods on the upper surface of a stove. Conventional pressure cookers consist of a container which is sealed and includes a vent. However, conventional pressure cookers are constructed of metal. Thus, conventional pressure cookers cannot be used in a microwave oven because of their metal composition.

A conventional pressure cooker operates on the principle of using water in a pressure container to cook the food by utilizing both steam and pressure. A conventional pressure cooker requires a good seal in order to prevent steam from leaking from the interior of the container. If steam leaks from the pressure cooker there is a tendency to boil off the water within the pressure cooker.

The Welch patent, U.S. Pat. No. 2,622,187, discloses a microwave pressure cooker wherein a container 2 is constructed of metal. The metal container 2 is positioned within a cavity 12 of a microwave oven which is also constructed of metal. In effect, the combination of the metal container and the metal microwave oven cavity acts as a single unit which enables the container to actually function as a miniature microwave oven. It is important to note that Welch does not disclose a pressure regulator. Welch discloses a container which may have a steam vent 5 containing a suitable type of pressure-release valve. The container of Welch is designed to be a "pressure-type" container wherein the sealed pressure vessel permits no steam or food vapor to escape from the food.

The Dills patent, U.S. Pat. No. 4,093,841, is directed to a slow-cooking, no-steam, no-boiling type of food cooking container. The Dills container is used to cook a food product at a certain temperature just below the boiling temperature.

SUMMARY OF THE INVENTION

It is a primary object of the present invention to provide a pressure compensating container which permits the rapid cooking of food within a microwave oven while eliminating the problems of food dehydration.

Another object of the present invention is to provide a pressure compensating container which may be used within a microwave oven and may also be used on the upper portion of a conventional stove.

A further object of the present invention is to provide a pressure compensating container which automatically releases steam from the container, thus losing a quantity of water from the container, while still cooking the food disposed therein.

A still further object of the present invention is to provide a container which may be constructed as a bag having a certain strength and including a pressure regulator to permit pressure cooking therein.

A further object of the present invention is to provide a container which may be used as a canning jar.

These and other objects of the present invention are accomplished by providing a pressure compensating container wherein the container walls are constructed of a dielectric material which is a microwave permeable material. The pressure compensating container includes a pressure regulating mechanism to regulate the steam pressure within the container. The container may be constructed to have fixed walls. A second embodiment of the present invention may include a dielectric material which is flexible. The present invention may also be utilized to can food products for later use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a perspective view of a second embodiment of the present invention illustrating a flexible bag container having a pressure compensating device;

FIG. 4 is an enlarged view of the pressure regulating device illustrated in FIG. 3;

FIG. 5 is a perspective view of another embodiment of the present invention wherein the lid is held relative to the base by means of a buckle; and FIG. 6 is a perspective exploded view showing another embodiment of the present invention wherein a container is used as a canning jar.

DETAILED DESCRIPTION OF THE INVENTION

Figure 1:
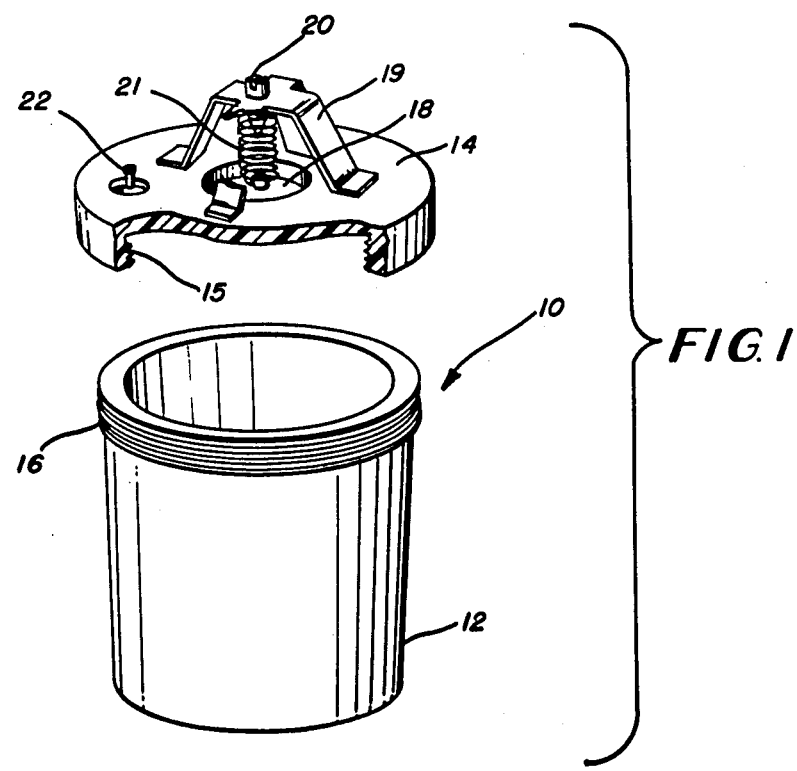
FIG. 1 is a perspective view showing a fixed wall dielectric container including a screw-on lid and pressure regulating mechanism according to the present invention.
Figure 2:
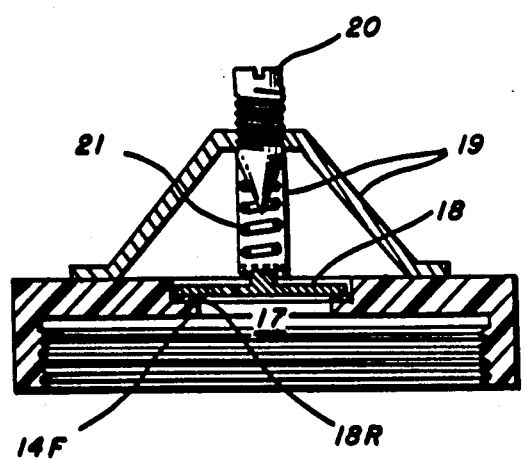
FIG. 2 is a partial cross-sectional view of the lid illustrated in FIG. 1.

Referring to FIGS. 1 and 2, a pressure compensating container 10 includes a base receiving portion 12 and a closure lid 14. The base receiving portion 12 is threaded at the upper open end 16 to engage with threads 15 disposed on the closure lid 14.

As illustrated in FIG. 2, the closure lid 14 includes an aperture 17 which extends therethrough. The aperture 17 is formed adjacent to a flange member 14F. The flange member 14F is a integral member with the closure lid 14. A valve member 18 is mounted to normally be engaged with the flange portion 14F. The valve member 18 closes the interior of the base receiving portion 12 and prevents gas and vapor below a predetermined pressure from escaping therefrom.

The valve member 18 is biased to a closed position by means of spring 21. The spring 21 is in engagement with a threaded adjusting screw 20. The threaded adjusting screw 20 is positioned in a threaded opening through the bracket 19 which is affixed to the closure lid 14. The spring 21 has a predetermined modulus of elasticity to bias the valve 18 downwardly to the closed position. The modulus of elasticity may be varied by advancing or retracting the threaded screw 20 disposed in the bracket 19. In addition, although not illustrated in the drawings, the spring 21 may consist of a rubber block disposed between the bracket 19 and the valve 18. The rubber block would have a modulus of elasticity to hold the valve member in the normally closed position. However, as pressure increases within the base receiving portion as energy is supplied thereto, the rubber block would deform permitting the valve 18 to displace upwardly away from the flange 14F. In this manner, steam and vapor from within the interior of the base receiving portion 12 would be vented to the exterior.

The closure lid 14 includes a safety relief button 22. The safety relief button 22 permits an individual to relieve pressure from within the pressure compensating container after a cooking operation is performed. The pressure relief button 22 consists of a rubber seal with a valve stem projecting therethrough. By depressing the valve stem an individual would vent the interior of the base receiving portion 12 to the atmosphere.

As illustrated in FIG. 2, the valve 18 rest on a rubber gasket 18R. The rubber gasket ensures a good seal between the valve 18 and the flange 14F. Any suitable type of sealing member can be employed between the valve member 18 and the flange 14F to ensure proper sealing.

As illustrated in FIGS. 3 and 4, a second embodiment of the present invention is set forth. A collapsible bag 30 is employed to contain a food product during cooking. A valve member 31 is positioned at the opened end of the bag 30. The valve 31 includes a collar 32 which projects inwardly thereof. A flange member 33 is disposed at one end of the collar 32. The flange 33 extends inwardly into the open space formed by the collar 32. The flange 33 includes an internal flange 35 which defines an aperture 37 extending therethrough. A valve 34 is designed to mate with the internal flange 35 to seal the interior of the flexible bag 30 from the atmosphere.

A spring 41 is positioned between the bracket 42 and the valve member 34. The spring 41 biases the valve 34 downwardly into engagement with the internal flange 35. A threaded screw member 43 is positioned in a threaded aperture in the bracket 42 and engages the spring 41. The tension of the spring 41 may be varied by advancing or retracting the threaded screw 43 relative to the bracket 42. As set forth hereinabove, the spring 41 may be replaced with a block of resilient material having a predetermined modulus of elasticity. The block of material would be deformed when a predetermined pressure is applied to the valve 34 from within the flexible bag 30.

A retaining ring 44 is positioned to fit around the flexible bag 30 and retains it relative to the collar 32. The ring 44 includes a clamp 45 for securing the ring in a fixed position after the flexible bag 30 is gathered about the collar 32.

The flexible bag 30 has a material strength so as to contain approximately 10 pounds per square inch. The food product positioned within the flexible bag 30 would tend to inflate the bag as pressure builds up therein. The pressure compensating valve 34 is normally in a closed position. The valve 34 permits pressure to build up within the flexible bag 30 to a predetermined value. Once the pressure within the flexible bag 30 reaches the predetermined value the valve 34 is biased against the spring 41 to permit vapor and steam to exit from the interior of the flexible bag 30.

As illustrated in FIG. 5, another embodiment of the present invention is set forth. In this embodiment, a base receiving portion 52 is provided with a socket 53 mounted on an upper surface thereof. A buckle member 55 is positioned diametrically opposite to the socket 53. A closure lid 54 is provided with a seal 56 and a buckle clip 57. A pressure relief button 58 is disposed on the closure lid 54. In operation, the seal 56 would be positioned within the socket 53. The lid 54 would rest on the upper surface of the base receiving portion 52. Thereafter, the buckle 55 would engage the buckle clip 57 and be moved to a locked position to retain the closure lid 54 relative to the base receiving portion 52.

The embodiment of the pressure compensating container as set forth in FIG. 5 includes a rubber sealing gasket 60 disposed between the closure lid 54 and the base receiving portion 52. The rubber gasket 60 would ensure a proper seal during a food cooking operation. If the pressure within the base receiving portion 52 reaches a predetermined value the seal 60 would deform permitting vapor and steam to exit from the base receiving portion 52. The pressure value whereby vapor and steam is released from the base receiving portion 52 is determined by the thickness of the gasket 60 and the tightness of the buckle 55 relative to the buckle clip 57.

As illustrated in FIG. 6 another embodiment of the pressure compensating container according to the present invention is set forth. In this embodiment a base receiving portion 62 is utilized together with a closure lid 64 to function as a canning jar. The base receiving portion 62 includes an upper threaded portion 66. The threaded portion 66 mates with the threaded portion 65 on the retaining cap 67. The closure lid 64 is positioned on the base receiving portion 62 and a gasket 68 is disposed on the upper portion of the closure lid 64. Thereafter, the cap 67 is threaded onto the threaded portion 66 of the base receiving portion 62. The tightness of the cap member 67 determines the squeezing pressure of the rubber gasket 68. In this manner, the closure lid 64 would be able to vent steam and vapor from the interior of the base receiving portion 62 only to the extent permitted by the tightness of the gasket 68 positioned between the cap member 67 and the closure lid 64.

When a food product is positioned within the pressure compensating container base receiving portion 12, 30, 52 or 62, and is exposed to microwave radiation within the cavity portion of a microwave oven, liquid is extracted from the food product and a vapor pressure is produced within the container. As the vapor pressure within the pressure compensating container increases, the valve 18, 34, 60 or 68 disposed between the closure lid and the base receiving portion is moved to permit a venting of the interior portion of the pressure compensating container. The degree of venting is directly proportional to the spring tension retaining the valve member in its closed position. In the embodiment illustrated in FIGS. 5 and 6, the degree of venting is directly proportional to the thickness of the gasket 60, 68. In the embodiment illustrated in FIG. 5 the tension of the buckle 55 as it retains the buckle clip 57 influences the venting of the container. In the embodiment illustrated in FIG. 6, the tightness of the cap 67 to the base receiving portion 62 influences the venting of the container.

The vapor pressure produced within the pressure compensating container ensures an even cooking of the food. In addition, the food is not permitted to dehydrate since the pressure compensating container is a sealed container and only permits a limited amount of vapor to escape from the system.

A modern microwave oven is extremely efficient in raising the temperature of water to cause it to boil. The pressure compensating container according to the present invention may be positioned within a microwave oven to initiate the cooking process and to cause water disposed within the pressure compensating container to reach the boiling point. After the pressure compensating container is in a steady state of operation wherein water vapor is at a predetermined pressure within the container, then the entire container as set forth in the embodiment illustrated in FIGS. 1 and 5 may be removed and positioned directly on a burner disposed on the upper surface of a conventional stove. In this manner, food disposed within the pressure compensating container may be heated so as to entirely cook the food disposed therein.

The pressure compensating container of the present invention is constructed of a microwave permeable material which is also heat resistant. The container may be constructed of a heat resistant glass, ceramic material or any other suitable material for the intended purpose. In addition, the spring members and the other elements of the invention may be constructed of enforced polytetrafluoroethylene or other material which would be suitable for use within a microwave oven.

The pressure compensating container according to the present invention is designed to cook a food product within a microwave oven without the necessity of adding water to the food product. The food product is merely positioned within the pressure compensating container and inserted within a microwave oven. The microwaves will release moisture trapped within the food and produce a vapor pressure within the pressure compensating container. The vapor pressure increases the cooking speed and preserves the flavor of the food. This is in sharp contrast to cooking a food product on an open dish within a microwave oven which usually dries the food and makes it extremely tough. The hydronic cooking produced by the pressure compensating container of the present invention bastes the food in its own juices without burning or scorching the food. This phenomena browns the outside of the food product.

In constructing the pressure compensating container of the present invention the spring employed to hold the valve member in a normally closed position may be coated with a plastic material to prevent corrosion. The spring may be constructed of a springy material and copper plated for conductivity non-resonant at microwave oven frequencies.

The size of the valve member is a parameter which may be varied. The valve member may be 2 inches or 1 inch in diameter. The valve is large enough so that it is not a small orifice which is being blocked. However, the valve is small enough so that the spring does not have to be constructed too strong. A 1 inch valve and a 7 pound spring perform satisfactory.

In constructing the pressure compensating container as illustrated in FIGS. 1 and 2, the bridge 19 is preferably constructed as a four-legged bridge to support the spring thrust. The screw 20 may be utilized to adjust the pressure of the spring 21. In addition, the spring 20 facilitates the assembling and cleaning of the pressure compensating container by permitting an individual to actually remove the valve member 18 for subsequent cleaning.

When employing the embodiment illustrated in FIG. 6, a food product is positioned directly within the base receiving portion 62. The lid 64 and the rubber gasket 68 are disposed on the upper surface of the base receiving portion 62. The cap 67 is threaded onto the thread 66. Thereafter, the pressure compensating container is inserted within a microwave oven to cook the food positioned within the container. After the food product is cooked the container is removed from the microwave oven and left to cool so that a vacuum forms within the container. The vacuum retains the closure lid 64 in tight contact with the base receiving portion 62.

The gasket 68 serves as a spring so that when the cap 67 is tightened by its threads, the combination of the tightness and the resiliency of the gasket 68 permit the closure lid 64 to vent the interior of the container. The container illustrated in FIG. 6 is easily adjusted to 5-10 pounds per square inch. This pressure is a good pressure for cooking and canning.

The present invention is useful in canning because it automatically sterilizes the container. No additional steps are necessary after the product positioned within the container is cooked within the microwave oven except for removing the container for cooling purposes. Microwave oven cooking speed can be utilized for the first time in the canning process. In addition, the taste and mineral retention improvement is quite significant in view of the fact that the food product is cooked within the container and is subsequently stored in the same container.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pressure compensating container comprising:
   a base portion including a bottom member and upwardly projecting sidewalls which terminate at an upper surface, said base portion defining a cavity into which a food product may be positioned;
   a threaded portion positioned adjacent said upper surface on said upwardly projecting sidewalls of said base portion;
   a closure lid adapted to mate with said upper surface of said upwardly projecting sidewalls for forming a closure for said cavity;
   a threaded portion positioned on said closure lid for mating with said threaded portion on said upper surface of said upwardly projecting sidewalls of said base portion for securely retaining said closure lid relative to said base portion;
   said closure lid including an aperture disposed therein;

a valve member operatively positioned for selectively closing said aperture in said closure lid;

a bracket secured to said closure lid and being disposed adjacent to said aperture and including a portion spaced a predetermined distance above said closure lid;

resilient biasing means operatively positioned between said bracket and said closure lid for selectively retaining said valve member in a closed position relative to said aperture;

adjusting means disposed on the top of said bracket portion and in engagement with said resilient biasing means for adjusting the amount of pressure of said resilient biasing means exerted on said valve member, said valve member, said adjusting means and said resilient biasing means forming a resiliently biased pressure regulating valve in operative communication with said cavity to selectively vent said cavity of steam or vapor when microwave radiation or heat is applied thereto;

said base portion, said closure lid and said valve member being constructed of a microwave permeable material.

2. A pressure compensating container according to claim 1, and further including a sealing gasket operatively positioned between said valve member and said closure lid adjacent to said aperture.

3. A pressure compensating container according to claim 1, wherein said resiliently biasing means is a coil spring.

4. A pressure compensating container according to claim 1, and further including a safety pressure relief valve having a manually operated pressure relief button for relieving the pressure within said cavity of said pressure compensating container.

5. A pressure compensating container according to claim 1, wherein said container is an elongated cylindrical container.

* * * * *